United States Patent [19]

Hederer et al.

[11] Patent Number: 4,785,554

[45] Date of Patent: Nov. 22, 1988

[54] METHOD AND APPARATUS FOR CONDITIONING BULK MATERIAL

[75] Inventors: Hartmut Hederer, Dortmund; Manfred Kreft, Wetter; Wolfgang Hillebrand, Dortmund, all of Fed. Rep. of Germany

[73] Assignee: UHDE GmbH, Fed. Rep. of Germany

[21] Appl. No.: 125,230

[22] Filed: Nov. 25, 1987

[30] Foreign Application Priority Data

Nov. 27, 1986 [DE] Fed. Rep. of Germany ....... 3640610

[51] Int. Cl.$^4$ .............................................. F26B 9/00
[52] U.S. Cl. ........................................ 34/164; 34/178
[58] Field of Search ......................... 34/164, 171, 176

[56] References Cited

U.S. PATENT DOCUMENTS

| | | | |
|---|---|---|---|
| 3,058,235 | 10/1962 | Morris et al. | 34/171 |
| 3,742,614 | 7/1973 | Bettermann et al. | 34/178 X |
| 3,743,697 | 7/1973 | Jones, Jr. | 34/171 X |
| 4,125,945 | 11/1978 | Westelaken | 34/171 X |
| 4,223,452 | 9/1980 | Chambers | 34/171 X |
| 4,702,694 | 10/1987 | Johnson et al. | 34/178 X |

FOREIGN PATENT DOCUMENTS 2048494 10/1970 Fed. Rep. of Germany .

Primary Examiner—Steven E. Warner
Attorney, Agent, or Firm—Marshall & Melhorn

[57] ABSTRACT

Bulk material containing vaporizable ingredients, such as lignite, hard coal, peat, waste wood, clarifier sludge, waste sludge, contaminated earth, catalysts, zeolites and filter cake, is conditioned by means of a vibrating plate conveyor divided into a heating section and a drying section, using an indirect heat exchange method. The bulk material is heated in an enclosed heating section while withdrawing the vapor from this section. In the downstream enclosed drying section, the vaporizable fractions contained in the bulk material are further reduced with the aid of heat supplied indirectly, the vapor being withdrawn. The bulk material is separated several times into coarse and fine fractions utilizing at least one slotted grid, the fines being immediately recycled and remixed with the coarse fractions which have a higher water content. The bulk material is mixed several times while being heated in the drying section before discharge.

23 Claims, 5 Drawing Sheets

METHOD AND APPARATUS FOR CONDITIONING BULK MATERIAL

BACKGROUND OF THE INVENTION

The invention relates to a method and apparatus for conditioning bulk material containing vaporizable ingredients, the flow of the material being maintained by means of a vibrating plate conveyor and, in particular, to the material being treated in a heating section and a downstream drying section using an indirect heat exchange method.

Conditioning of bulk material is defined as a reduction of the vaporizable fractions (i.e. drying) and, if required, cooling of the hot material to the temperature permitted for dumping. The conditioning process is continuous. In the case of such processes and/or devices, it is indispensable that the specific material properties be considered for each process step in order to avoid disturbances.

West German patents DE- 849,226 and DE- 2,153,435, European patent EP- 0,030,947 and British patent GB- 857,250, for example, describe devices for conditioning bulk material, the heating being performed directly or indirectly. The known devices and the related processes are not universally suitable for many different materials because they have only been adapted to certain properties, the heat exchange capacity is low and the equipment requires a large space.

SUMMARY OF THE INVENTION

An object of the invention is to condition bulk material of a large grain size distribution and of different properties in a continuous process, thus ensuring low energy consumption and trouble-free plant operation, and to reduce the size of the required equipment.

Another object of the invention, as far as the method is concerned, is achieved by the following method: The flow of the bulk material containing vaporizable ingredients is maintained by means of a vibrating plate conveyor and the material is conditioned in a heating section and a downstream drying section using an indirect heat exchange technique. Thus, the bulk material is heated from the ambient to a maximum temperature of 170° C., using steam of the required pressure and final temperature in an enclosed section from which the vapor is withdrawn. In the enclosed downstream drying section, the water content of the bulk material is reduced in the pesence of steam originating from the vapor in this section and, with the aid of additional indirect heat, the vapor being withdrawn. In the drying section, the material is separated several times into fine and coarse fractions, the fines being immediately recycled and remixed with the coarse. The bulk material is mixed several times while the two sections are being heated.

In addition, the dust-laden vapor originating from the hot bulk material in the drying section is completely or partly re-used for the heating section or a part-stream is compressed mechanically for indirect generation of heating steam required for the heating section. Also, the heating condensate originating from the drying section is used for heating the upstream heating section.

If the bulk material to be conditioned cannot be dumped at the high drying temperature, the hot material withdrawn from the drying section is fed directly to a cooling section of the vibrating plate conveyor in which the material is indirectly cooled to at least 60° C. under an inert gas blanket. If it is necessary to dry the bulk material further, a dry inert gas stream is injected into the drying section, the stream flowing in the opposite direction to the bulk material.

The invention has many advantages. A partition separating the heating section from the drying section prevents the drying section vapor from condensing on the cold bulk material fed to the device. The repeated mixing of the material by means of the mixing jibs, the repeated separation of fine and coarse fractions and the remixing of the fines with the coarse in the flow direction of the vibrating conveyor permit a thorough mixing of fractions of different temperatures. During the material flow in the vibrating conveyor, the bulk material segregates partly, i.e. the fines accumulate in the lower part of the stream and the coarse fractions in the upper part of the stream. Hence, the fines reach a higher temperature than the coarse and become drier. The repeated mixing of the classified and/or mixed material in the two sections improves the heating of the bulk material by means of the heating plates. Since the corase fractions have to be dried longer than the fines, even if fine and coarse fractions are completely mixed, this disadvantage is eliminated by the separation process, the recycling and the remixing of the hot fines.

The partition separating the heating section from the drying section is vapor-tight and, consequently, it is possible to withdraw the hot vapors forming in the drying section and to re-use them for heating the heating section. Thus, the heating energy requirements are reduced. If a sufficient quantity of vapor is available for compressing the dust-laden steam in a vapor turbocompressor, it may be utilized for the indirect generation of clean heating steam in an evaporator, the steam being used in the heating section. If the heating steam condensate originating from the drying section is hot enough, it can be used as additional heating medium for the heating section.

If an enclosed cooling section has to be installed directly behind the drying section, it is possible to provide for an inert gas blanket, thus avoiding self-ignition of the bulk material.

The apparatus designed according to the invention has substantial advantages compared with the known vibrating conveyors for conditioning bulk material. It requires little space and yet permits a high heat transfer. Since each section is partitioned, the vapors cannot influence the next conditioning step and the heating steam utilization can be optimized. Moreover, more heat is transferred to the coarse fractions and the residual moisture is more homogeneous as a result of the separation by means of slotted grids. The mixing jibs installed in the heating and drying sections intensity the mixing of the bulk material during each round on the plates. The chutes attached to the plates near the discharge openings reduce the quantity of dust escaping from this section through the rising vapor stream.

BRIEF DESCRIPTION OF THE DRAWINGS

The above, as well as other advantages of the present invention, will become readily apparent to those skilled in the art from the following detailed description of preferred embodiment when considered in the light of the accompanying drawings in which.

DESCRIPTION OF THE PREFERRED EMBODIMENT

Figure 1:
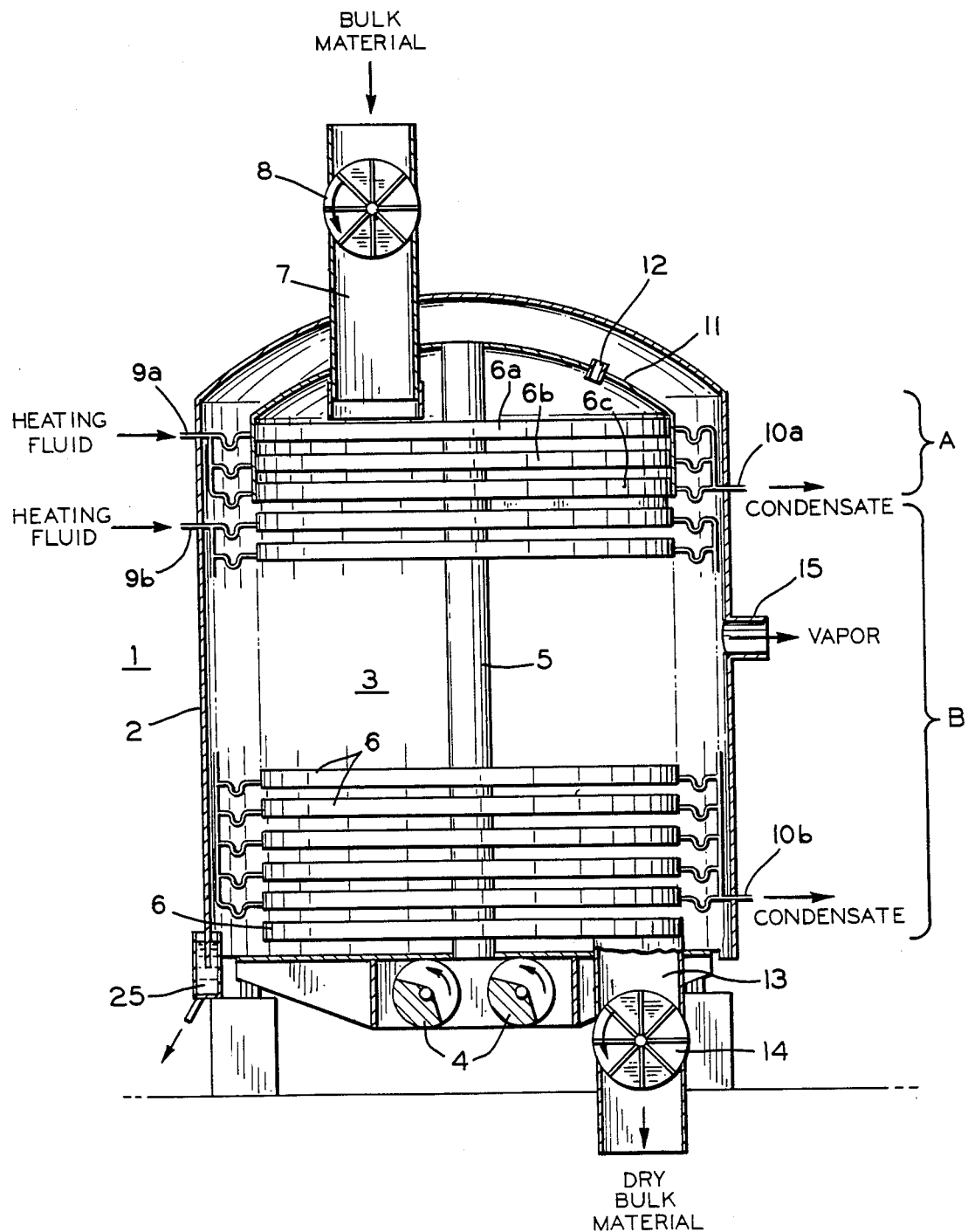
FIG. 1 is a schematic front elevation view of a vibrating plate conveyor in partial cross section in accordance with the present invention.

According to FIG. 1, a drier 1 includes a static shell 2 enclosing a vibrating plate conveyor 3. The conveyor 3 has vibrators 4 located at a lower end thereof and coupled to a generally vertically extending vibrator shaft 5. The shaft 5 extends through and is attached to a plurality of stacked, spaced apart, generally horizontally extending heated plates 6 each having a discharge opening formed therein. Bulk material is fed to a plate 6a, the topmost one of the plates, through an inlet pipe 7 equipped with a star wheel feeder 8. Plates 6a, 6b and 6c, the three uppermost plates, include heating tubes which are connected to a heating fluid inlet 9a and a fluid outlet 10a. The plates 6a, 6b and 6c are enclosed by a jacket 11 to form a heating section "A".

The inlet 9a and the outlet 10a are connected through the jacket 11 to provide heating liquid to heat bulk material to the water boiling point, i.e. 100° C. Vapor forming in section "A" is withdrawn by an outlet 12 formed in an upper surface of the jacket 11. When the outlet 12 is closed, inert gas which is fed with the bulk material escapes through the discharge openings in the plates. The bulk material leaving the heating section "A" through the discharge opening of the bottom plate 6c enters a drying section "B", passes all of the plates 6 and thereby is constantly heated to obtain the required drying. The dry bulk material is withdrawn by a star wheel feeder 14 through an outlet pipe 13 connected to the lowermost one of the plates 6. The plates 6 in the drying section "B" are also provided with heating tubes connected to heating fluid through an inlet 9b and an outlet 10b which can be the same as the inlet 9a and the outlet 10a respectively. The vapor forming in the heating section "B" is withdrawn by an outlet 15 formed in a sidewall of the shell 2. The plates 6 are described in more detail in connection with FIGS. 7 through 10. The shell 2 can be of a design having an open lower end which cooperates with a water seal 25.

Figure 2:
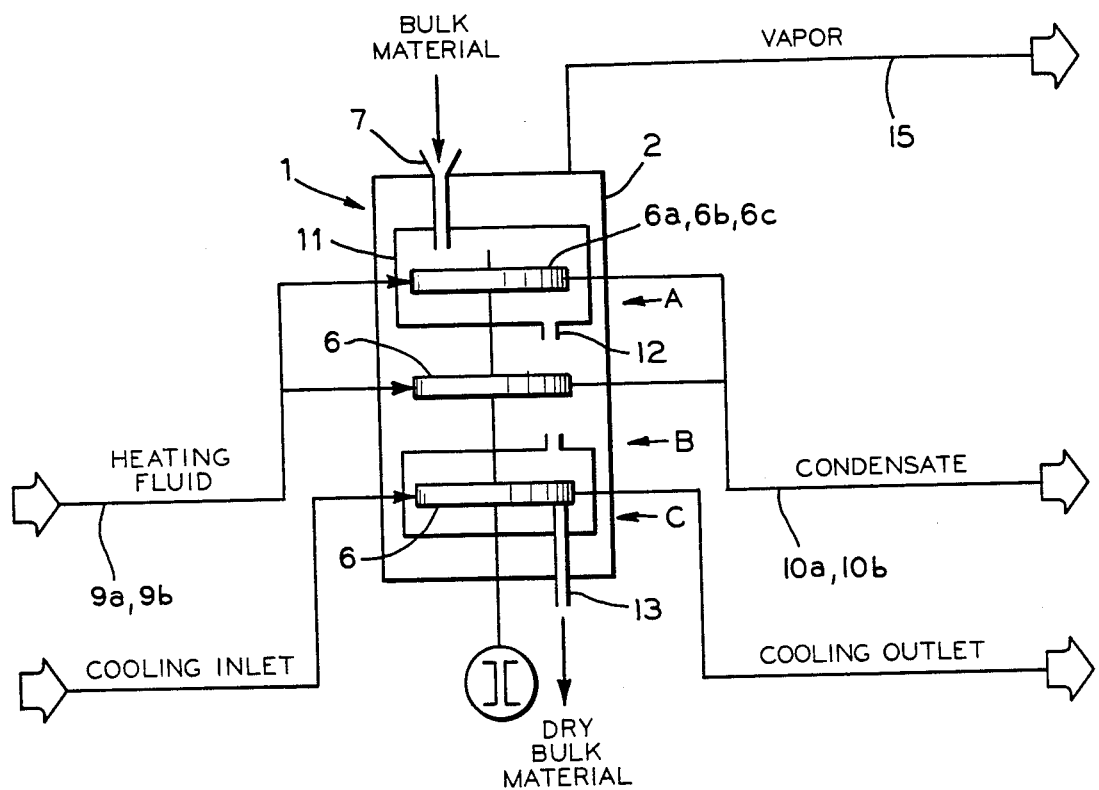
FIG. 2 is a heat balance schematic diagram of the present invention.

There is shown in FIG. 2 a heat balance diagram in which 48.8 tons/hour of crude lignite are fed at a temperature of 20° C. and fifty-eight percent solids by weight to the drier 1 by means of the inlet pipe 7 and the star wheel feeder. 30.5 tons/hour of heating steam at 180° C. are required to reduce the residual moisture content of the lignite to eighteen percent before it is withdrawn from the drier. The steam is generated from the heating fluid entering the inlets 9a and 9b. If the hot and dry crude lignite requires thorough cooling, an enclosed cooling section "C" is arranged downstream of the drying section "B" in the vibrating plate conveyor unit. The plates 6 of the cooling section "C" are water cooled. The vapor forming in this section and the inert gas flow into the internal chamber of the drier 1, or they are withdrawn separately. The vapor forming in the drier is withdrawn by the outlet 15.

Figure 3:
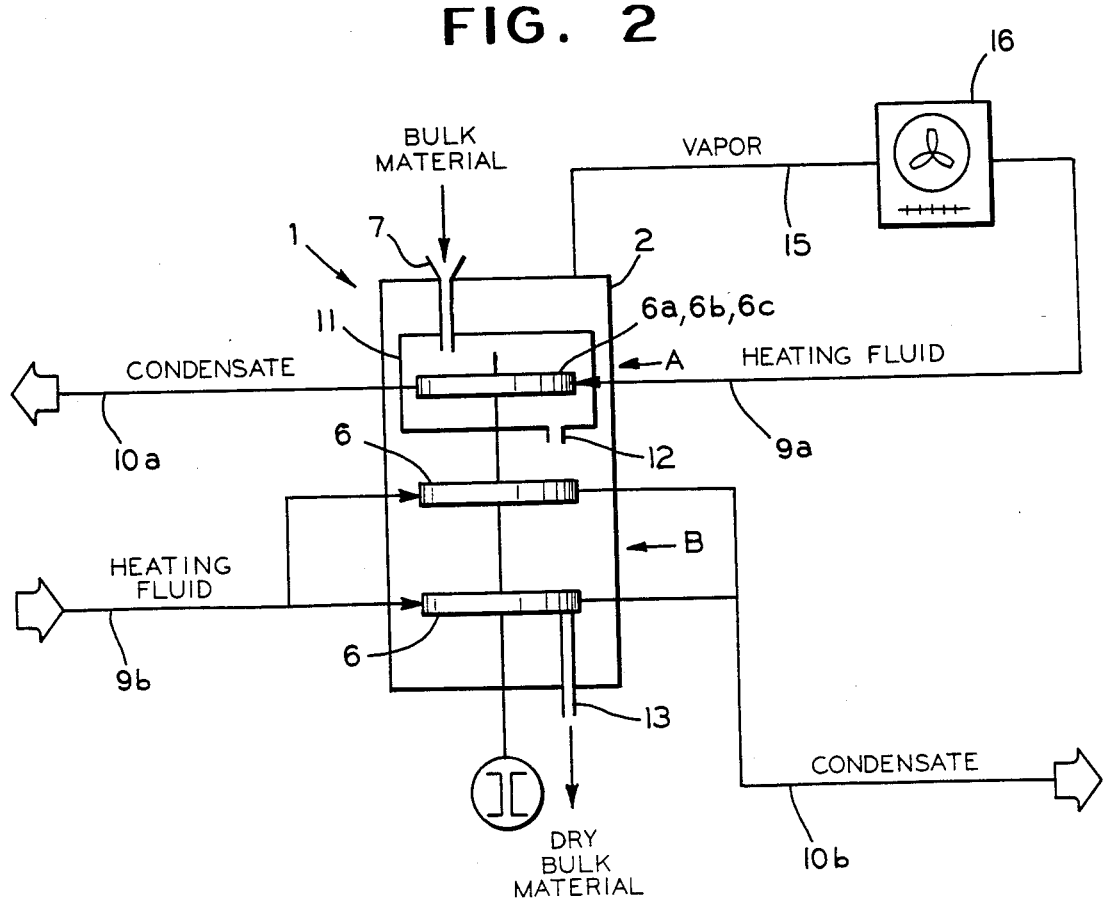
FIG. 3 is a heat balance schematic diagram of an alternate embodiment of the present invention utilizing vapor condensate.

FIG. 3 is a heat balance diagram of an alternate embodiment of the present invention. Only the plates 6 of the drying section "B" are fed with the heating steam from the fluid inlet 9b. The vapor originating from the hydrous crude lignite is withdrawn by means of a fan 16 connected to the outlet 15. The vapor condenses to form hot water which is piped from the fan 16 to the plates 6a, 6b and 6c of the heating section "A" via the fluid inlet 9a. Thus, the heating steam requirement can be reduced by as much as eight percent.

Figure 4:
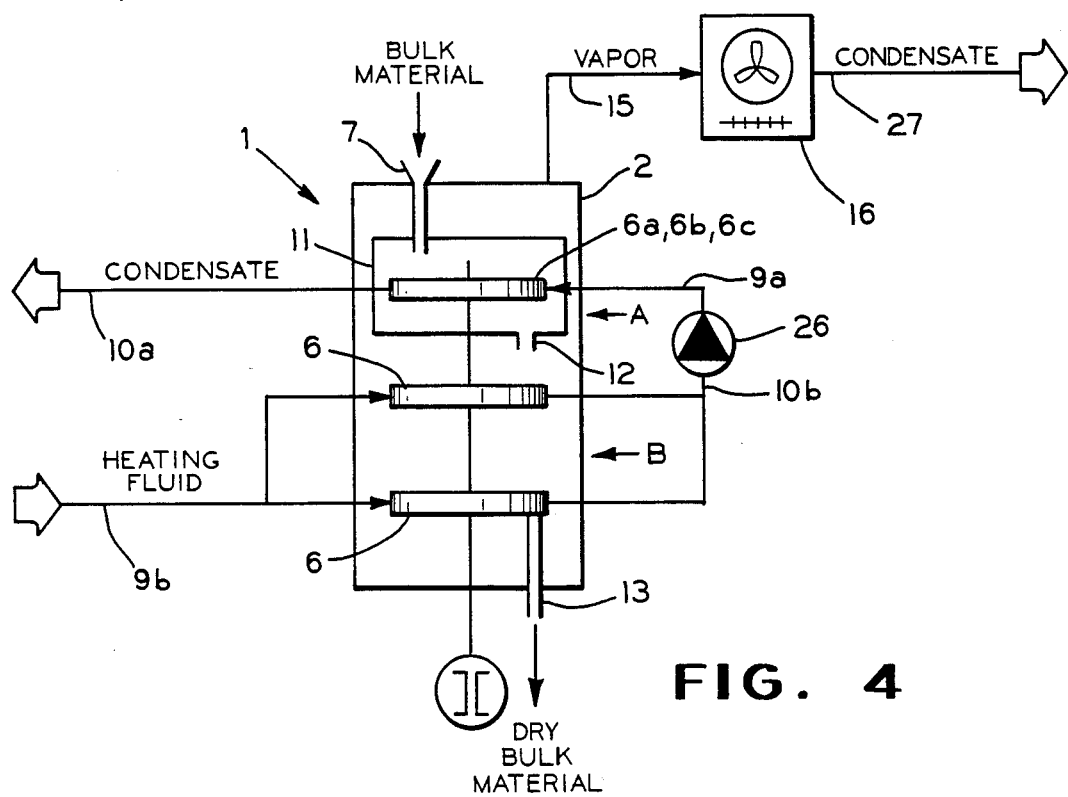
FIG. 4 is a heat balance schematic diagram of a second alternate embodiment of the present invention utilizing heating steam condensate.

There is shown in FIG. 4, a second alternate embodiment of the dryer 1 which is arranged such that the condensate from the plates in the drying section "B" can be used for the plates in the heating section "A", if a constant quantity of crude lignite is fed to the unit. Thus, the outlet 10b is connected to the inlet 9a through a valve 26 to supply heating condensate to the heating section "A". The vapor outlet line 15 is connected to the fan 16 and condensate fluid exits the fan via an outlet line 27.

Figure 5:
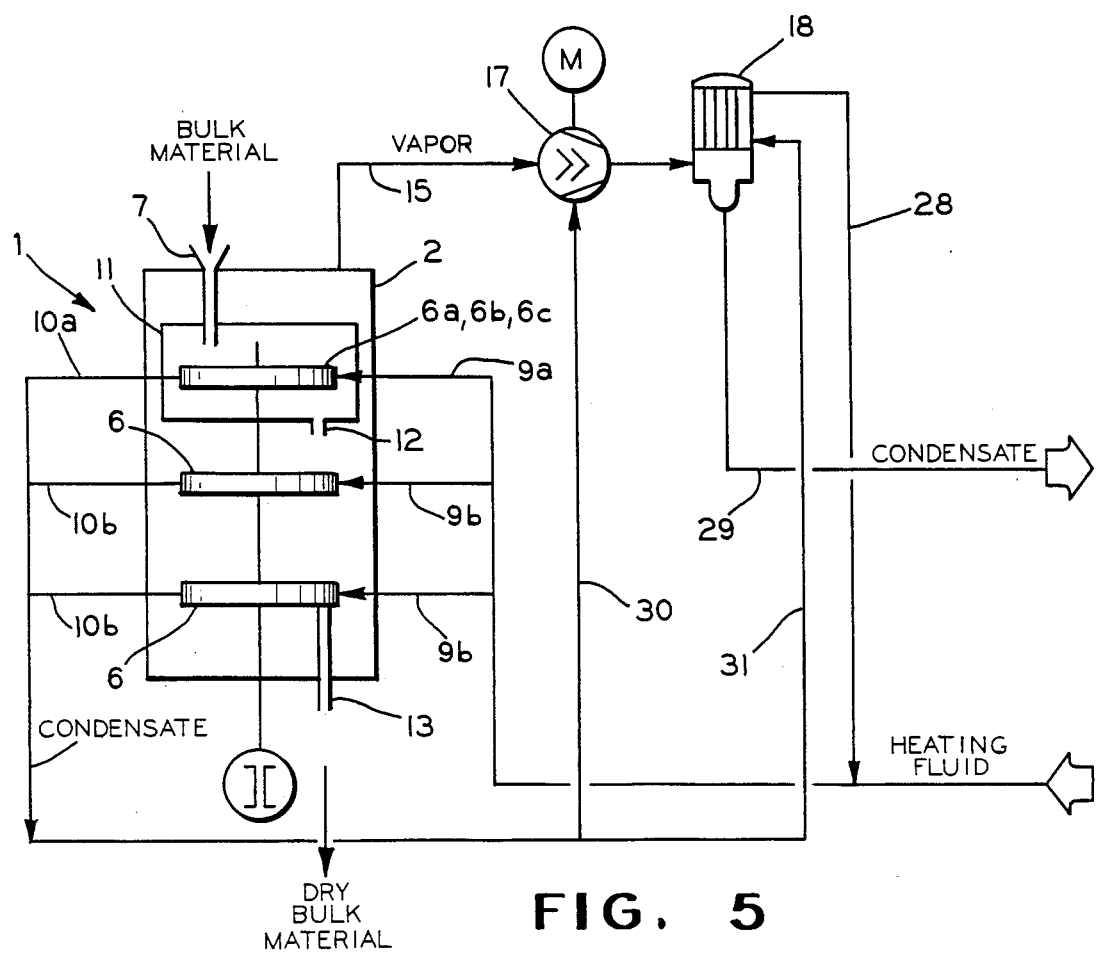
FIG. 5 is a heat balance schematic diagram of a third alternate embodiment of the present invention utilizing compression of a vapor part-stream.

In FIG. 5, the plates 6 of the drying section "B" are fed with fresh heating steam if the vibrating plate dryer 1 has a constant input of crude lignite. A partial stream of the vapor withdrawn from the shell via the outlet 15 is compressed in a vapor compressor 17 and, consequently, it is superheated and fed to a heat exchanger 18 for the production of heating steam required for the heating section "A". The required heating steam is withdrawn from the heat exchanger 18 via a line 28 which is connected to the heating fluid inlets 9a and 9b. Any surplus vapor is available for other requirements. Condensate from the heat exchanger 18 is drawn off via an outlet 29. The condensate from the heating section "A" via the line 10a and the condensate from the drying section "B" from the line 10b can be fed back to the vapor compressor 17 via a line 30 and to the heat exchanger 18 via a line 31.

Figure 6:
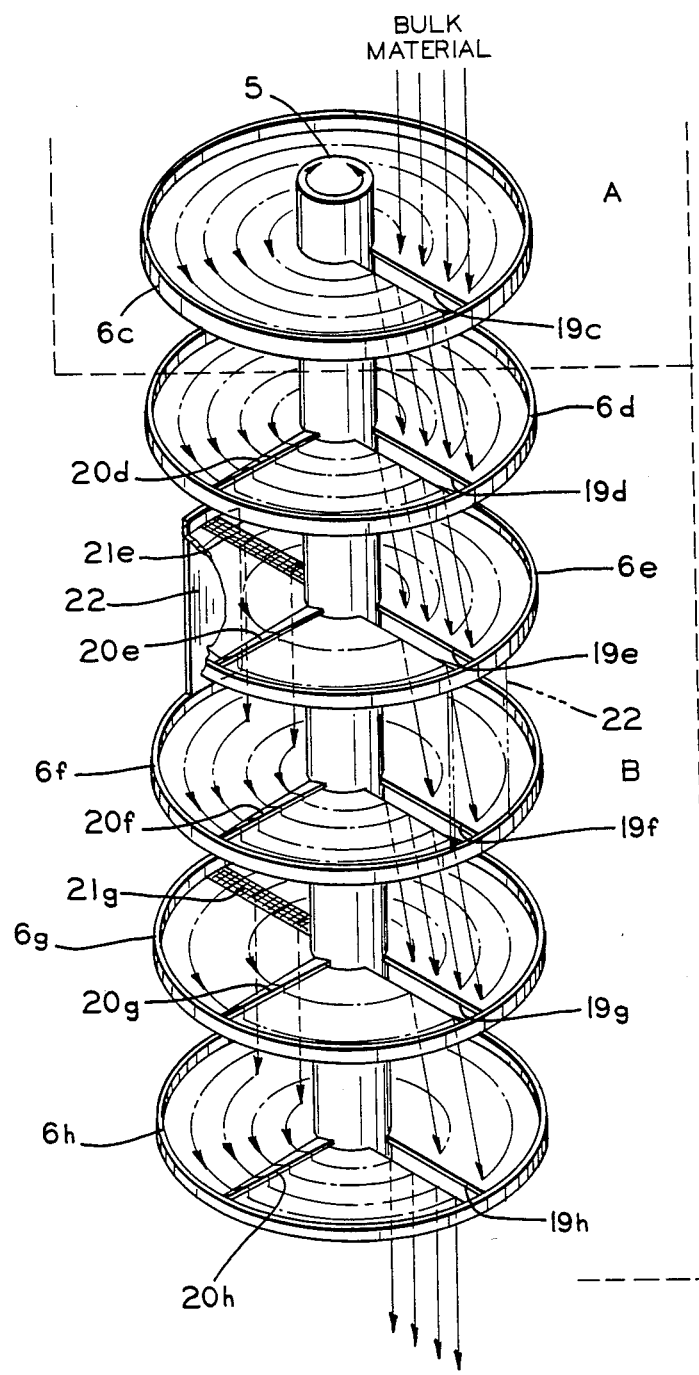
FIG. 6 is an enlarged perspective view of the vibrator shaft and heated plates shown in FIG. 1.

There is shown in FIG. 6 a perspective view of the plates of the heating section "A" and the drying section "B" to illustrate the process of separation and remixing of the fine and coarse fractions. Streams of bulk material represented by arrows leave the last plate 6c of the heating section "A" through a discharge opening 19c. The bulk material falls through a chute (not shown) upon the upper surface of a first plate 6d of the drying section "B". The material remains on this plate for one round and is mixed by a mixing jib 20d until it reaches a discharge opening 19d. The advantage of the mixing process utilizing the mixing jibs is that the bulk material of different grain sizes is mixed in such a manner that the concentration of fines increases in the lower part of the material stream and that the coarse fractions accumulate in the upper part of the stream. Hence, the fines reach a higher temperature and transfer heat upon the coarse fractions but they are not overdried.

A plate 6e located below the plate 6d has a slotted grid 21e spaced from a discharge opening 19e and extending from the vibrator shaft 5 to the peripheral edge of the plate 6e. The slots can be formed with a longitudinal axis extending tangentially to a circumference defined by a radius from the shaft 5. When the material flows across the grid 21e, the fines fall through the slot-type openings upon the coarse fractions on the next lower plate 6f, the coarse fractions having left through the discharge opening 19e and the chute (not shown). During the conveying cycle, the fines concentrate in the lower part of the stream while the coarse fractions come into the upper part and, consequently, the fines transfer heat upon the coarse and absorb moisture. When the material flow has completed the required distance, determined by the diameter of the plate and the location of the opening, and the bulk material has been mixed from one to several times by means of mixing jibs, the material leaves the plate 6f via a chute (not shown) and collects on a next lower plate 6g. Fine and coarse fractions again perform a round to the next slotted grid 21g. The plates with the slotted grid and those without such grids are mounted alternately on the vibrator shaft 5. The required number of plates depends upon the residual water content specified for the bulk material. In order to reduce the dust discharge caused by the vapor in the areas of the mixing jibs, slotted grids and discharge openings, it is necessary to provide cylindrical wall segments 22 for at least two of the plates 6.

Figure 7:
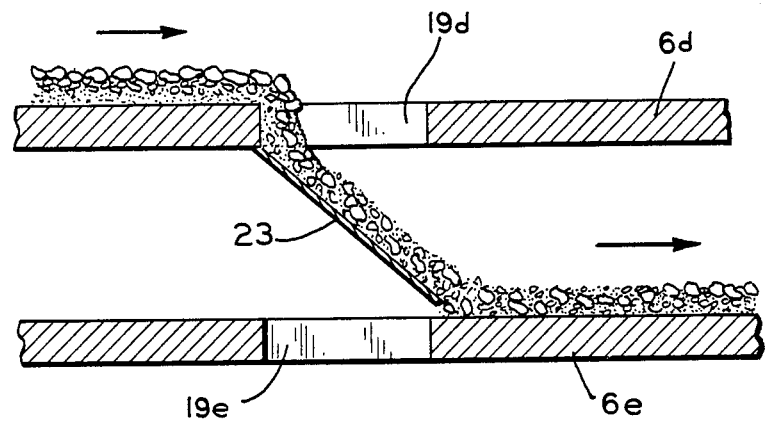
FIG. 7 is a fragmentary enlarged cross-sectional view of the discharge openings and connecting chute shown in FIG. 6.

FIG. 7 is a fragmentary cross sectional view showing a cross section through adjacent ones of the plates 6. The discharge openings of the individual plates are arranged one above the other and linked by means of chutes 23. This configuration largely prevents the formation of dust normally caused by dry bulk material falling upon the next plate.

Figure 8:
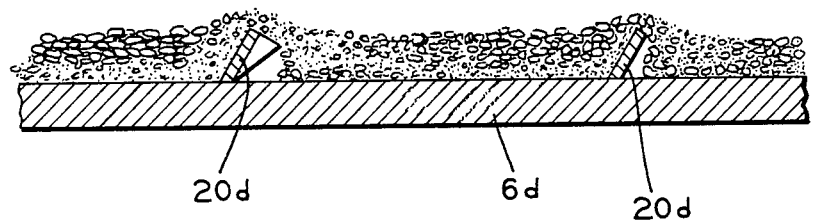
FIG. 8 is a fragmentary enlarged cross-sectional view of the mixing jibs shown in FIG. 6.

FIG. 8 is a fragmentary cross-sectional view through one of the plates 6 showing the position of the inclined mixing jibs 20 permitting a more or less thorough mixing of the bulk material. Moreover, one or more of the jibs 20 have to be arranged on the plates in such a manner that insufficient flow and poor distribution of the material on the plate surface are avoided.

Figure 9:
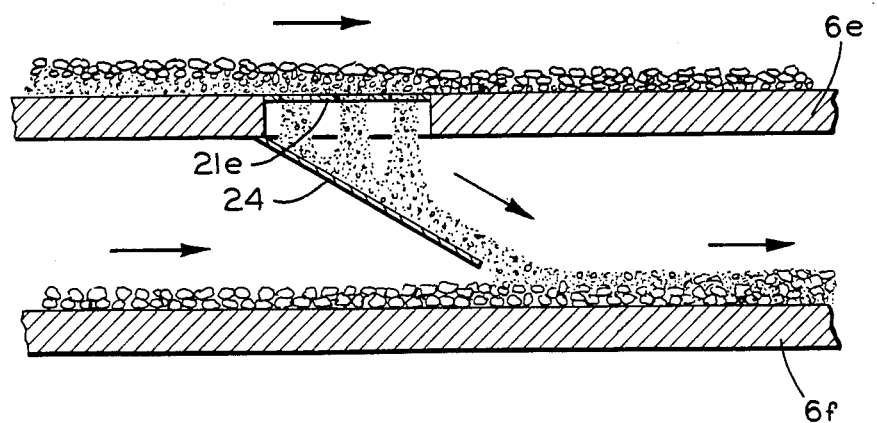
FIG. 9 is a fragmentary enlarged cross-sectional view of the slotted grids and connecting chute shown in FIG. 6.

In FIG. 9, there is shown a fragmentary cross-sectional view through the plates 6e and 6f. The fines in the bulk material on the upper surface of the plate 6e fall through the slotted grid 21e upon a chute 24 which distributes the fines on the layer of coarse fractions on the upper surface of the plate 6f. The length of the chute 24 is such that its lower end is located above the upper surface of the bulk material on the plate 6f so an not to impede the flow of bulk material.

The slotted grids 21 mounted in the plates 6 permit a separation of the fines from the coarse fractions and thus constitute an essential advantage of the method according to the present invention. It is known that coarse fractions do not dry as quickly as the fines. In order to maintain a homogeneous moisture content of all grain sizes, it is essential that the residence time of the coarse fractions be longer than that of the fines. This aim can be achieved by means of the slotted grids 21 arranged such that the flow distance provided for the drying of the fines is shorter than that of the coarse fractions, i.e. said grids reduce the residence upon time of the fines to fifty per cent per plate because the fines leave the plates through the grids 21 in a positio one hundred eighty degrees from the openings 19 and are remixed with the coarse material on the next plate. This improves also the heat transfer from the fines to the coarse fractions.

The sequence of vibrating plates with and without slotted grids 21 and the distance required for the individual fractions depend on the moisture content of the various grain sizes of the bulk material and on the heat transfer.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A method for conditioning bulk material containing vaporizable ingredients, the material flow being maintained by means of a vibrating plate conveyor and the material being treated in a heating section and a downstream drying section using an indirect heat exchange method, comprising the steps of:
   (a) providing bulk material to a heating section of a vibrating plate conveyor and heating the bulk material from ambient temperature to a predetermined maximum temperature in the heating section by providing a heating fluid to the heating section and withdrawing vapor generated by the heating fluid from the heating section;
   (b) reducing vaporizable ingredients in the bulk material by introducing said vapor withdrawn from the heating section into a drying section and indirectly supplying additional heat and withdrawing vapor from the drying section;
   (c) repeatedly separating the bulk material into fine and coarse fractions in the drying section, the fine fractions being immediately recycled and remixed with the coarse fractions between each said separation; and
   (d) mixing the bulk material at least twice in both the heating section and the drying section.

2. The method according to claim 1 including a step of directing at least a portion of said vapor formed in the drying section to the heating section for indirectly heating the bulk material.

3. The method according to claim 1 including a step of directing all of said vapor formed in the drying section to the heating section for indirectly heating the bulk material.

4. The method according to claim 1 including a step of compressing said vapor formed in the drying section and utilizing at least a portion for indirectly producing heating steam to be utilized in the heating section.

5. The method according to claim 1 including a step of utilizing heating condensate formed in the drying section for heating the bulk material in the heating section.

6. The method according to claim 1 including a step of cooling the bulk material to ambient temperature in a cooling section after the bulk material has passed through the drying section.

7. The method according to claim 1 including a step of feeding inert gas into the drying section to reduce the partial pressure of said vapor.

8. The method according to claim 7 wherein said inert gas flows in a direction opposite to the direction of travel of the bulk material, the quantity of said inert gas being a fraction of the vaporizable ingredients set free from the bulk material in the drying section.

9. An apparatus for conditioning bulk material containing vaporizable ingredients, the apparatus including a vertical vibrating plate drier have a plurality of generally horizontally extending, circular plates, each of said plates formed with at least one discharge opening therein, said plates being mounted in spaced apart relation along a generally vertically extending vibrating shaft passing through a central portion of each of said plates, a shell enclosing the plates and the shaft, an inlet for bulk material formed in an upper portion of the shell, an outlet for the bulk material formed in a lower portion of the shell, an inlet formed in the shell and adapted to be connected to a source of heating fluid, and an outlet formed in the shell for withdrawing the heating fluid, comprising:

at least an uppermost two of a plurality of circular plates enclosed in a shell defining a heating section and the remaining ones of said plates defining a drying section;

a jacket enclosed by the shell and in turn enclosing the ones of said plates forming the heating section, said jacket having an inlet in communication with the bulk material inlet and having an outlet for bulk material;

at least one of said plates in the drying section having a radially extending slot-type grid formed therein for passing a fine fraction of the bulk material and for preventing passage of a coarse fraction of the bulk material;

at least one of said plate in both the heating section and the drying section including a mixing jib; and a plurality of chutes each positioned between an adjacent pair of said plates and attached to an upper one of said pair of plates, each said upper plate having a discharge opening formed therein adjacent an associated one of said chutes.

10. The apparatus according to claim 9 including a first material feeder located in a bulk material inlet of the shell and a second material feeder located in a bulk material outlet of the shell.

11. The apparatus according to claim 9 wherein said slot-type grid is formed of a plurality of slots each having a longitudinal axis extending tangentially to a circumference defined by a different length radius extending from a vibrator shaft upon which an associated plate is mounted.

12. The apparatus according to claim 9 including a chute attached to and extending from a downwardly facing surface of said plate having said grid formed therein.

13. The apparatus according to claim 9 including a cylindrical wall segment extending between peripheries of adjacent ones of said plates adjacent at least one of said mixing jibs.

14. The apparatus according to claim 9 including at least one cylindrical wall segment extending between peripheries of adjacent ones of said plates in the area of said grid.

15. The apparatus according to claim 9 including at least one cylindrical wall segment extending between peripheries of adjacent ones of said plates in the area of said chutes.

16. The apparatus according to claim 9 wherein the shell is open at a lower end thereof and is positioned in a water seal.

17. The apparatus according to claim 9 including means for directing at least a portion of vapor formed in said drying section to indirectly heat said heating section.

18. The apparatus according to claim 9 including means for compressing vapor formed in said drying section and indirectly generating steam therefrom for heating said heating section.

19. The apparatus according to claim 9 including means for directing heating condensate formed in said drying section to heat said heating section.

20. The apparatus according to claim 9 including means for cooling bulk material after the bulk material has passed through said drying section.

21. The apparatus according to claim 9 including means for feeding inert gas into said drying section.

22. The apparatus according to claim 9 wherein said jib extends radially from a vibrator shaft upon which an associated plate is mounted to a periphery of said associated plate.

23. The apparatus according to claim 22 wherein said mixing jib increases in height from a central area toward a periphery of said associated plate.

* * * * *